United States Patent
Kissa et al.

(10) Patent No.: US 11,378,825 B2
(45) Date of Patent: Jul. 5, 2022

(54) ELECTRICAL-OPTICAL MODULATOR

(71) Applicant: Lumentum Operations LLC, San Jose, CA (US)

(72) Inventors: Karl Kissa, Gilroy, CA (US); David Glassner, Morgan Hill, CA (US); Stephen Jones, Northamptonshire (GB); Robert Griffin, Northamptonshire (GB); John M. Heaton, Worcestershire (GB)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/835,872

(22) Filed: Mar. 31, 2020

(65) Prior Publication Data
US 2021/0080796 A1  Mar. 18, 2021

Related U.S. Application Data

(60) Provisional application No. 62/901,504, filed on Sep. 17, 2019.

(51) Int. Cl.
*G02F 1/225* (2006.01)
*G02F 1/01* (2006.01)
(Continued)

(52) U.S. Cl.
CPC ............ *G02F 1/011* (2013.01); *G02F 1/025* (2013.01); *G02F 1/0356* (2013.01);
(Continued)

(58) Field of Classification Search
CPC ...... G02F 1/011; G02F 1/2255; G02F 1/0356; G02F 1/2257; G02F 2201/127;
(Continued)

(56) References Cited

U.S. PATENT DOCUMENTS 4,448,479 A * 5/1984 Alferness ............... G02F 1/3134
385/2
4,553,810 A * 11/1985 Alferness ............... G02F 1/0356
385/132

(Continued)

OTHER PUBLICATIONS

"Broadening the bandwidth and increasing the efficiency of travelingwave integrated-optic modulators" by Zolotov et al, Proc. SPIE 1932, Guided-Wave Optics (Year: 1993).*

(Continued)

*Primary Examiner* — Robert Tavlykaev
(74) *Attorney, Agent, or Firm* — Harrity & Harrity, LLP

(57) ABSTRACT

An electrical-optical modulator may include one or more optical waveguides to propagate one or more optical signals in a direction of propagation. An optical waveguide of the one or more optical waveguides may include a time delay section, a first modulation section preceding the time delay section in the direction of propagation, and a second modulation section following the time delay section in the direction of propagation. The first modulation section and the second modulation section may be configured to be associated with opposite modulation polarities, and the time delay section may be configured to delay a phase of the one more optical signals relative to the first modulation section. The electrical-optical modulator may include one or more signal electrodes to propagate one or more signals in the direction of propagation in order to modulate the one or more optical signals through electrical-optical interaction.

23 Claims, 11 Drawing Sheets

(51) Int. Cl.
*G02F 1/035* (2006.01)
*G02F 1/025* (2006.01)
*G02B 6/12* (2006.01)
*G02F 1/21* (2006.01)

(52) U.S. Cl.
CPC .......... *G02F 1/2255* (2013.01); *G02F 1/2257* (2013.01); *G02B 2006/12142* (2013.01); *G02F 1/212* (2021.01); *G02F 2201/127* (2013.01); *G02F 2202/102* (2013.01); *G02F 2203/50* (2013.01)

(58) Field of Classification Search
CPC ......... G02F 2202/102; G02F 2001/212; G02F 2203/50; G02B 2006/12142
USPC ........................................................ 385/1–3
See application file for complete search history.

(56) References Cited

U.S. PATENT DOCUMENTS

| | | | |
|---|---|---|---|
| 5,091,981 | A | 2/1992 | Cunningham |
| 6,377,717 | B1 | 4/2002 | Kimber et al. |
| 6,580,840 | B1 | 6/2003 | McBrien et al. |
| 7,082,237 | B2 | 7/2006 | Walker et al. |
| 7,251,408 | B1 | 7/2007 | Gunn, III et al. |
| 8,218,914 | B2 | 7/2012 | Kissa |
| 8,530,821 | B2* | 9/2013 | Green .................. G02F 1/0121 250/216 |
| 9,817,249 | B2 | 11/2017 | Doerr |
| 9,939,708 | B2 | 4/2018 | Aimone et al. |
| 10,120,212 | B2 | 11/2018 | Baehr-Jones et al. |
| 10,241,354 | B1 | 3/2019 | Gill |
| 10,295,847 | B1* | 5/2019 | Tytgat .................. G02F 1/2257 |
| 10,416,525 | B2 | 9/2019 | Zhou |
| 10,831,081 | B2 | 11/2020 | Vera et al. |
| 2002/0154842 | A1 | 10/2002 | Betts |
| 2004/0047529 | A1* | 3/2004 | Soda ..................... G02F 1/3133 385/2 |
| 2005/0123242 | A1* | 6/2005 | Walker ................. G02F 1/2257 385/40 |
| 2008/0095485 | A1* | 4/2008 | Sugiyama ............ G02F 1/0356 385/3 |
| 2009/0263078 | A1 | 10/2009 | Hosomi et al. |
| 2014/0112611 | A1* | 4/2014 | Vermeulen ........... G02F 1/2257 385/3 |
| 2015/0212346 | A1 | 7/2015 | Zheng et al. |
| 2016/0363834 | A1 | 12/2016 | Velthaus et al. |
| 2017/0075148 | A1 | 3/2017 | Baudot et al. |
| 2019/0253149 | A1* | 8/2019 | Ding .................... G02F 1/0123 |
| 2019/0324345 | A1* | 10/2019 | Vera Villarroel ..... G02F 1/2255 |
| 2019/0361315 | A1 | 11/2019 | Zhou |
| 2020/0225556 | A1 | 7/2020 | Hayashi et al. |
| 2020/0285084 | A1 | 9/2020 | Ji et al. |
| 2020/0363665 | A1 | 11/2020 | Latrasse et al. |
| 2021/0080797 | A1 | 3/2021 | Kissa et al. |

OTHER PUBLICATIONS

"Optimization of Phase-Reversal Travelling-Wave Optical Modulators" by Zhu et al., Microwave and Optical Technology Lhters, vol. 2, No. 7 (Year: 1989).*
"Optimal design of broadened flat bandpass electro-optic phase modulator based on aperiodic domain-inverted grating" by Chen et al., Journal of Optics A: Pure and Applied Optics, vol. 5, pp. 159-162 (Year: 2003).*
"Cutoff frequency", wikipedia article.*
"Cutoff frequency", Wikipedia article (Year: 2016).*
Breyne et al., "Electro-Optic Frequency Response Shaping in High Speed Mach-Zehnder Modulators," Paper Th2A.11, presented Mar. 8-12, 2020, 3 Pages.
Yoshihiro Ogiso, et al., "Over 67 GHz Bandwidth and 1.5 V Vπ InP-Based Optical IQ Modulator With n-i-p-n Heterostructure," Journal of Lightwave Technology, vol. 35, No. 8, Apr. 15, 2017, pp. 1450-1455.
Robert A. Griffin, et. al., "InP Mach-Zehnder Modulator Platform for 10/40/100/200-GB/s Operation," IEEE Journal of Selected Topics in Quantum Electronics, vol. 19, No. 6, Nov./Dec. 2013, 3401209.
Haitao Chen, "Development of an 80 Gbit/s InP-based Mach-Zehnder Modulator," Doctoral Dissertation, Elektrotechnik und Informatik der Technischen Universität Berlin, 2007.
Chen Wang, et. al., "100 GHz Low Voltage Integrated Lithium Niobate Modulators," CLEO 2018 Conference Proceedings, Paper SM3B.4.
D. W. Dolfi, et. al., "40 GHz electro-optic modulator with 7.5V drive voltage," Electronics Letters, Apr. 28, 1988, vol. 24, No. 9, pp. 528-529.
Norihide Kashio and Yusuke Nasu, "Compact Optical Modulator and Coherent Optical Subassemblies for Beyond 100G Transport Network," NTT Technical Review, vol. 14 No. 9 Sep. 2016, pp. 1-5.
Saeed Sharif Azadeh, et. al., "Low Vπ Silicon photonics modulators with highly linear epitaxially grown phase shifters," Optics Express, vol. 23, No. 18, Sep. 7, 2015.
Jianying Zhou, Jian Wang, Likai Zhu, Qun Zhang, and Jin Hong, "Silicon Photonics Carrier Depletion Modulators Capable of 85Gbaud 16QAM and 64Gbaud 64QAM," OFC 2019 Technical Digest, paper TYu2H.2.
Yanyang Zhou et al., "Modeling and optimization of a single-drive push-pull silicon Mach-Zehnder modulator," Photon. Res., vol. 4, No. 4, Aug. 2016, pp. 153-161.
Hui Yu, et. al., "Doping Geometries for 40G Carrier-Depletion-Based Silicon Optical Modulators," OFC 2012 Technical Digest, paper OW4F.4.
Hui Yu, et. al., "Silicon Carrier-Depletion-Based Mach-Zehnder and Ring Modulators with Different Doping Patterns for Telecommunication and Optical Interconnect," ICTON 2012 Technical Digest, paper Th.A4.3.
Junichi Fujikata, et. al., "High-Performance Si Optical Modulator with Strained p-SiGe Layer and its Application to 25 Gbps Optical Transceiver," IEEE publication 2017, pp. 25-26.
Kensuke Ogawa, et. al., "Silicon Mach-Zehnder Modulator of Extinction Ratio beyond 10dB at 10.0-12.5Gbps," ECOC 2011 Technical Digest, paper We.10.P1.28.
Nan Qi, et. al., "A 25 GB/s. 520mW, 6.4Vpp silicon-photonic Mach-Zehnder modulator with distributed driver in CMOS, OFC 2015 Technical Digest, paper W1B.3.
Toshihiko Baba, "Slow Light Devices in Silicon Photonics," OECC/PS2016 Techical Digest, IEICE, paper WE3-1.
Hasitha Jayatilleka, et. al., "Analytical Model and Fringing-Field Parasitics of Carrier-Depletion Silicon-on-Insulator Optical Modulation Diodes," IEEE Photonics Journal, vol. 5, No. 1, Feb. 2013.
Jianying Zhou, "Photonic Integrated Circuits: Silicon-photonic-based PIC modulators scale up for dense datacenter interconnects," Laser Focus World, Dec. 24, 2019.
Patel D., "Design, Analysis, and Performance of a Silicon Photonic Traveling Wave Mach-Zehnder Modulator," A Thesis Submitted to McGill University in Partial Fulfillment of the Requirements for the Degree of Master of Engineering, Dec. 2014, 141 pages.
Patel D., et al., "Design, Analysis, and Transmission System Performance of a 41 GHz Silicon Photonic Modulator," Optics Express, Optical Society of America, United States, Jun. 2015, vol. 23(11), pp. 14263-14287.

* cited by examiner

ELECTRICAL-OPTICAL MODULATOR

RELATED APPLICATION

This application claims priority to U.S. Provisional Patent Application No. 62/901,504, filed on Sep. 17, 2019 and entitled "EQUALIZED MODULATOR UTILIZING OPTICAL TIME DELAY," the content of which is incorporated by reference herein in its entirety.

TECHNICAL FIELD

The present disclosure relates to electrical-optical modulators and, more particularly, to electrical-optical modulators utilizing a time-delayed optical signal.

BACKGROUND

Optical modulators, such as electrical-optical modulators, impress or modulate electrical signals, such as radio frequency (RF) signals or microwave signals, onto an optical beam in order to generate a modulated optical beam that carries data. A typical electrical-optical modulator may be a voltage-controlled device that includes a traveling-wave electrode structure positioned in close proximity to an optical waveguide. The electrode structure produces an electric field that overlaps the optical waveguide over a predetermined distance (the interaction length) and causes an electromagnetic interaction that modulates the optical signal. For example, an electrical-optical modulator may include a set of RF signal electrodes, a set of ground electrodes, and a set of coplanar optical waveguides. The set of coplanar waveguides can be part of a Mach-Zehnder (MZ) interferometer.

SUMMARY

According to some implementations, an electrical-optical modulator may include: one or more optical waveguides to propagate one or more optical signals in a direction of propagation, an optical waveguide of the one or more optical waveguides including a time delay section, a first modulation section preceding the time delay section in the direction of propagation, and a second modulation section following the time delay section in the direction of propagation, the first modulation section and the second modulation section configured to be associated with opposite modulation polarities, and the time delay section configured to delay a phase of the one more optical signals relative to the first modulation section; and one or more signal electrodes to propagate one or more signals in the direction of propagation in order to modulate the one or more optical signals through electrical-optical interaction.

According to some implementations, an electrical-optical modulator may include one or more phase delay sections; and one or more modulation polarity reversal sections, the electrical-optical modulator having a frequency response characterized by a modulation bandwidth above a threshold value.

According to some implementations, an electrical-optical modulator may include one or more optical waveguides to propagate one or more optical signals in a circuitous path; and one or more signal electrodes to propagate one or more signals in a direct path in order to modulate the one or more optical signals through electrical-optical interaction.

DETAILED DESCRIPTION

Figure 1:
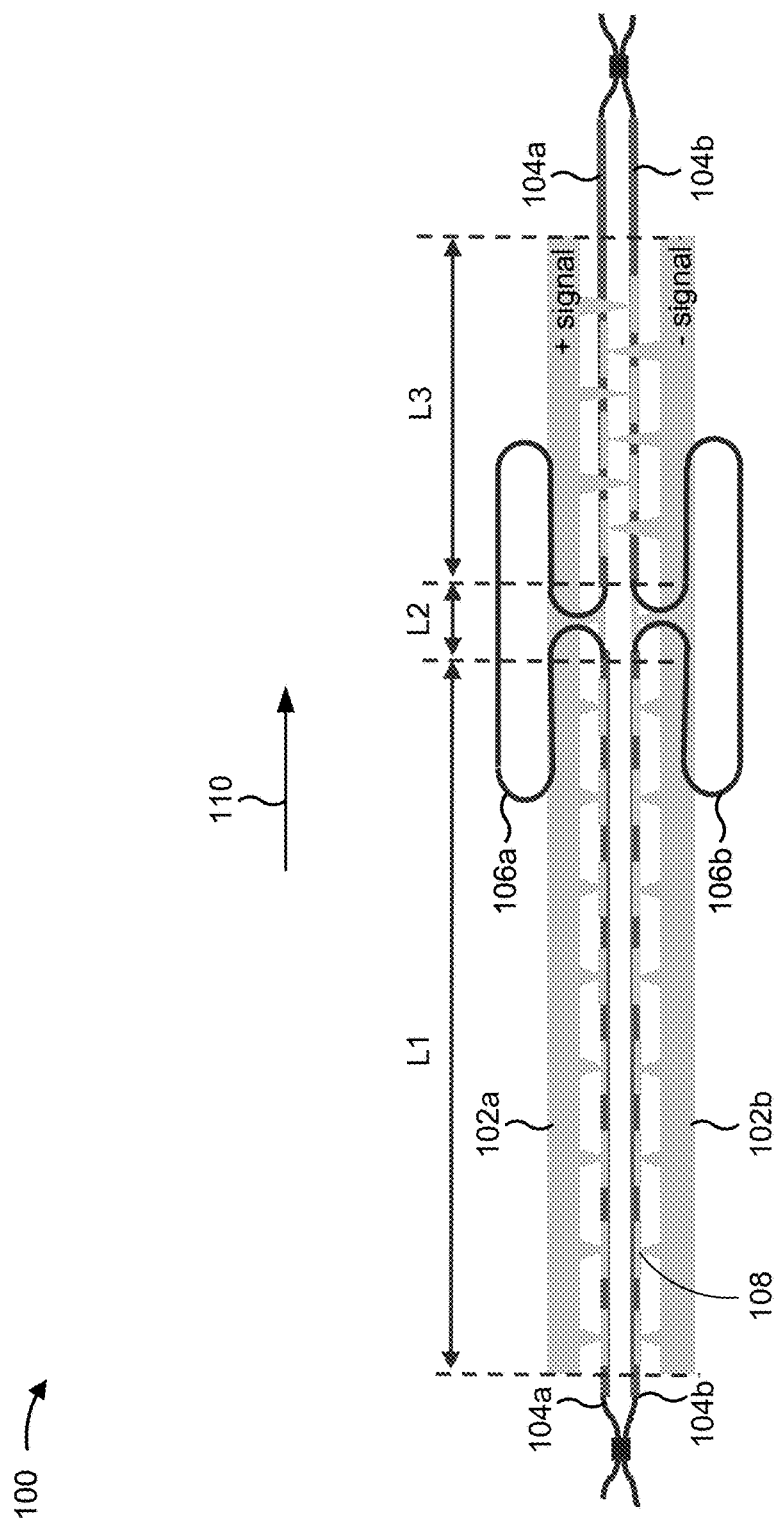
FIG. 1 is a diagram of an example electrical-optical modulator described herein.

The following detailed description of example implementations refers to the accompanying drawings. The same reference numbers in different drawings may identify the same or similar elements.

An electrical-optical modulator may modulate an optical signal over a bandwidth. Typically, the bandwidth may be increased by reducing electrical (e.g., RF) signal loss, such as by reducing an interaction length of an electrode and an optical waveguide of the electrical-optical modulator (e.g., by reducing a length of the electrode). However, reducing the interaction length may require an increase in a drive voltage of the electrical-optical modulator. Other approaches may use an equalization technique to increase bandwidth and reduce drive voltage. According to the equalization technique, the electrical-optical modulator may include an electrode path delay (e.g., a circuitous path of the electrode) to provide a time delay of the electrical signal, and may include a modulation polarity reversal, for example, to cancel with a phase shift caused by the time delay. However, the electrode path delay also may increase electrical signal loss (e.g., by increasing the length of the electrode). Moreover, the electrode path delay increases a footprint of the electrical-optical modulator, which may cause interference (e.g., crosstalk) between electrodes of multiple nested electrical-optical modulators.

Some implementations described herein provide an electrical-optical modulator that includes one or more modulation sections, a path delay on one or more optical waveguides of the electrical-optical modulator, and a modulation polarity reversal of the one or more optical waveguides in one or more of the modulation sections. In this way, the electrical-optical modulator provides a frequency response with increased modulation bandwidth. Moreover, inclusion of the path delay on an optical waveguide enables a length of an electrode of the electrical-optical modulator to be minimized, thereby reducing electrical (e.g., RF) signal loss that may decrease bandwidth. Furthermore, an optical waveguide is suitable for compact path delay geometries that can reduce or eliminate interference with other nearby (e.g., nested) electrical-optical modulators.

FIGS. 1-11 are diagrams of example electrical-optical modulators described herein. An electrical-optical modulator may be a modulator that uses a Pockels effect, an electro-optic effect, a quantum-confined Stark effect, a plasma dispersion effect, and/or the like, to change a phase of light under an applied voltage. In some implementations, an electrical-optical modulator may be an MZ modulator. For example, an electrical-optical modulator may be an indium phosphide (InP) MZ modulator. Alternatively, an electrical-optical modulator may employ silicon photonics, polymer, lithium niobate, thin lithium niobate, or gallium arsenide technologies.

In some implementations, an electrical-optical modulator may include one or more optical waveguides and one or more signal electrodes (e.g., one or more traveling-wave electrodes). A waveguide may propagate an optical signal in a direction of propagation of an electrical-optical modulator. An electrode may propagate an electrical signal (e.g., an RF signal, a microwave signal, and/or the like) in the direction of propagation. The electrical signal may modulate the optical signal through an electrical-optical interaction.

In some implementations, an electrical-optical modulator may include a set of waveguides (e.g., two waveguides). For example, an optical splitter may split an input optical signal to a first waveguide and a second waveguide of the electrical-optical modulator, and an optical combiner may combine an output of the first waveguide and the second waveguide. In some implementations, an electrical-optical modulator may include a set of electrodes (e.g., two electrodes). That is, the electrical-optical modulator may have a differential drive voltage. In such a case, a first electrode may propagate a positive polarity signal and a second electrode may propagate a negative polarity signal. Alternatively, an electrical-optical modulator may include a single electrode. That is, the electrical-optical modulator may have a single drive voltage.

As shown in FIGS. 1-11, an electrical-optical modulator may have a first section of length L1, a second section of length L2, and a third section of length L3. The first section, the second section, and the third section may be referred to herein as L1, L2, and L3, respectively. The first section L1 and the third section L3 may provide modulation for the electrical-optical modulator. That is, in the first section L1 and the third section L3, a waveguide and an electrode may interact (e.g., via electrical-optical interaction). Moreover, in the first section L1 and the third section L3, the waveguide and the electrode may be in a straight line (e.g., configured to provide a direct path for an optical signal or an electrical signal, respectively). In the second section L2, the electrode may be in a straight line (e.g., configured to provide a direct path for an electrical signal) and the waveguide may not be in a straight line (e.g., configured to provide a circuitous path for an optical signal). That is, the second section L2 may not provide modulation for the electrical-optical modulator.

In the first section L1 and the third section L3, the waveguide may be configured to guide an optical signal in a direction of propagation of the electrical-optical modulator, and in the second section L2, the waveguide may be configured to guide the optical signal in at least one direction other than the direction of propagation. Accordingly, in the second section L2, the waveguide may be configured to provide a path-length delay of an optical signal. In other words, a path length of the waveguide in the second section L2 may be greater than a path length of the electrode in the second section L2. The path-length delay of the optical signal may delay a phase of the optical signal. In some implementations, the first section L1, the third section L3, or one or more additional sections providing modulation may additionally, or alternatively, include a time delay of an electrical signal of an electrode. In this way, the electrical-optical modulator may have a frequency response characterized by a modulation bandwidth that satisfies (e.g., is greater than) a threshold value (e.g., 60 gigahertz (GHz), 75 GHz, 80 GHz, or 85 GHz).

FIG. 1 is a diagram of an example electrical-optical modulator 100 described herein. As shown in FIG. 1, electrical-optical modulator 100 may include a first signal electrode 102a, a second signal electrode 102b, a first optical waveguide 104a, and a second optical waveguide 104b. Electrical signals of the electrodes 102 may interact with optical signals of the waveguides 104 via a plurality of segmented loading lines 108. For example, the loading lines 108 may cover (e.g., abut, attach to, be in proximity of, cause electrical-optical interaction with, or otherwise be in association with) portions of the waveguides 104. In addition, a configuration of the loading lines 108 may provide signal velocity matching between an electrode 102 and a waveguide 104. The electrodes 102 may be configured to propagate an electrical signal in a direction of propagation 110 of the electrical-optical modulator 100, and the waveguides 104 may be configured to propagate an optical signal in the direction of propagation 110.

As shown in FIG. 1, the first waveguide 104a may include a first modulation section (spanning L1), a time delay section 106a (associated with L2), and a second modulation section (spanning L3). Similarly, the second waveguide 104b may include a first modulation section (spanning L1), a time delay section 106b (associated with L2), and a second modulation section (spanning L3). A time delay section 106 may be in optical communication with a first modulation section of a waveguide 104 at a first junction at a start of L2, and may be in optical communication with a second modulation section of the waveguide 104 at a second junction at an end of L2 (e.g., the time delay section 106 may begin and end in L2). Between the first junction and the second junction, the time delay section 106 may take a circuitous path (which may be outside of L2), such that a path length of the time delay section 106 is greater than a shortest distance between the first junction and the second junction. In some implementations, a path length, and corresponding time delay, of the first time delay section 106a may be different than a path length, and corresponding time delay, of the second time delay section 106b (e.g., to produce a chirp).

A time delay section 106 may include one or more curved bends. A bend radius of a curved bend may be from 60 micrometers (μm) to 200 μm. In some implementations, a bend radius of 100 μm may be used when the first waveguide 104a and the second waveguide 104b are separated by at least 50 μm and L2 is at least 250 μm. In some implementations, a bend radius of 60 μm may be used when the first waveguide 104a and the second waveguide 104b are separated by at least 10 μm and L2 is at least 130 μm. In some implementations, a time delay section 106 may have a path length of 680 μm when L1 is 2000 μm, L2 is 250 μm, and L3 is 600 μm. In such a case, a modulation bandwidth of electrical-optical modulator 100 may be 80 GHz, and electrical and optical propagation indices may be 3.6 and 3.7, respectively. In some implementations, L2 may be a minimum length that allows a waveguide 104 to include a time delay section 106 having at least two curved bends of a threshold bend radius, as described above (e.g., that allows a waveguide 104 to discontinue linearity with the first section L1 and continue linearity with the third section L3).

In some implementations, portions of the time delay section 106a and the time delay section 106b may be located outside of the first waveguide 104a and the second waveguide 104b. That is, the portions may not be located in a space between the first waveguide 104a and the second waveguide 104b.

As shown in FIG. 1, a first modulation section and a second modulation section of a waveguide 104 may be configured to have opposite modulation polarities. For example, in the first section L1, the first electrode 102a (+ signal) may modulate an optical signal of the first waveguide 104a, and the second electrode 102b (− signal) may modulate an optical signal of the second waveguide 104b. In particular, in the first section L1, loading lines 108 of the first electrode 102a may cover the first waveguide 104a, and loading lines 108 of the second electrode 102b may cover the second waveguide 104b. Continuing with the previous example, in the third section L3, the first electrode 102a (+ signal) may modulate an optical signal of the second waveguide 104b, and the second electrode 102b (− signal) may modulate an optical signal of the first waveguide 104a, thereby reversing modulation polarity experienced by the second waveguide 104b relative to the first waveguide 104a. In particular, in the third section L3, loading lines 108 of the first electrode 102a may cover the second waveguide 104b, and loading lines 108 of the second electrode 102b may cover the first waveguide 104a.

As indicated above, FIG. 1 is provided merely as an example. Other examples may differ from what is described with regard to FIG. 1.

Figure 2:
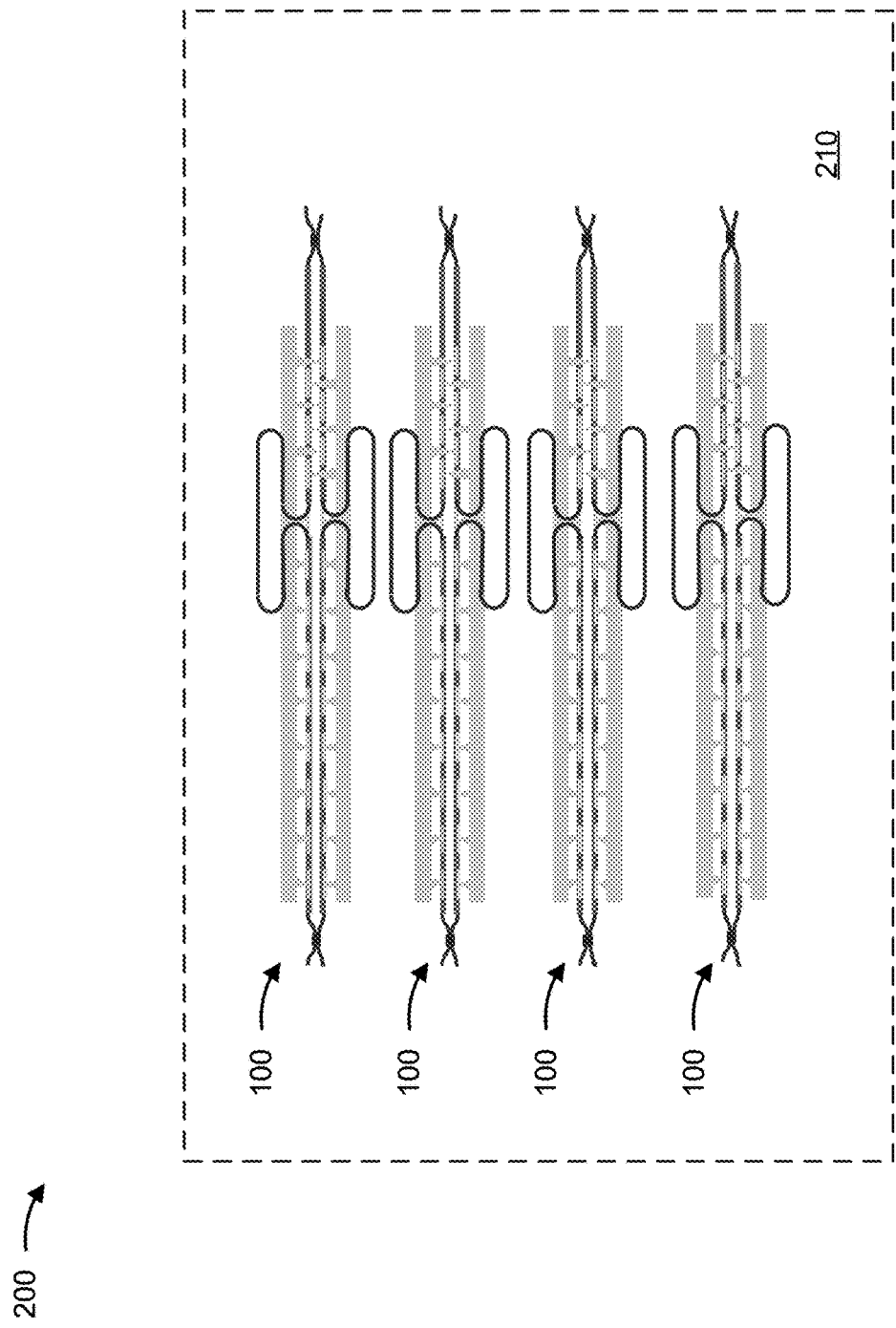
FIG. 2 is a diagram of an example electrical-optical modulator set described herein.

FIG. 2 is a diagram of an example electrical-optical modulator set 200 described herein. As shown in FIG. 2, the electrical-optical modulator set 200 may include a plurality of electrical-optical modulators 100 (e.g., in a nested configuration), as described above. In some implementations, the electrical-optical modulator set 200 may include more or less than four electrical-optical modulators 100. The plurality of electrical-optical modulators 100 may be supported on a substrate 210 (e.g., an InP substrate). As shown in FIG. 2, respective time delay sections of the electrical-optical modulators 100 may be separated by a threshold distance, such that interference (e.g., crosstalk) between the electrical-optical modulators 100 is reduced or eliminated. The compact geometry of the time delay sections permits the threshold distance to be minimized (e.g., relative to a threshold distance separating electrical-optical modulators employing path delays on electrodes).

As indicated above, FIG. 2 is provided merely as an example. Other examples may differ from what is described with regard to FIG. 2. For example, in some implementations, the plurality of electrical-optical modulators may include electrical-optical modulator 300, 400, 500, 600, 700, 800, 900, 1000, and/or 1100, as described herein.

Figure 3:
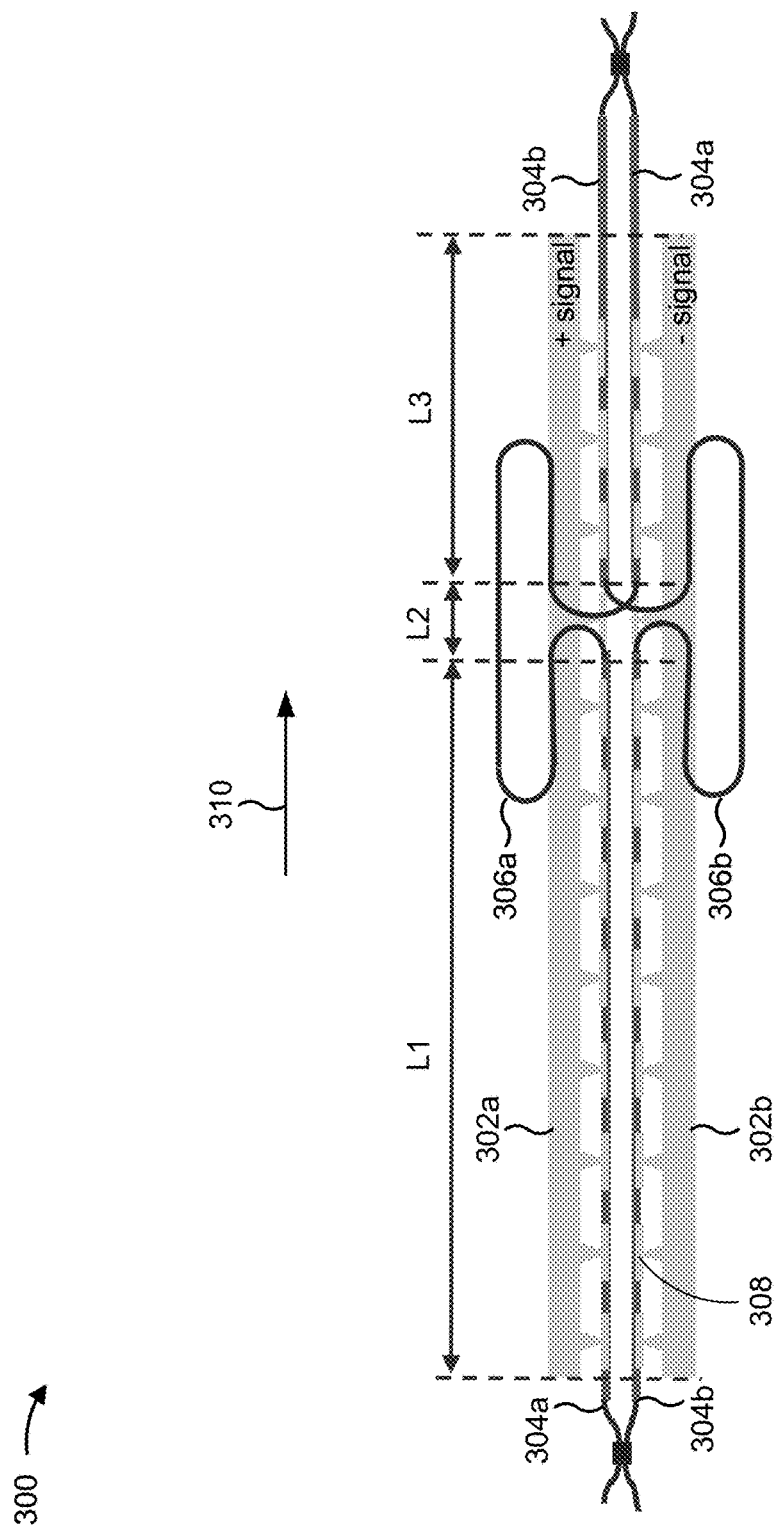
FIGS. 3-11 are diagrams of example electrical-optical modulators described herein.

FIG. 3 is a diagram of an example electrical-optical modulator 300 described herein. As shown in FIG. 3, electrical-optical modulator 300 may include a first signal electrode 302a, a second signal electrode 302b, a first optical waveguide 304a, and a second optical waveguide 304b. Electrical signals of the electrodes 302 may interact with optical signals of the waveguides 304 via a plurality of segmented loading lines 308, as described above in connection with FIG. 1. The electrodes 302 may be configured to propagate an electrical signal in a direction of propagation 310 of the electrical-optical modulator 300, and the waveguides 304 may be configured to propagate an optical signal in the direction of propagation 310.

As shown in FIG. 3, the first waveguide 304a may include a first modulation section (spanning L1), a time delay section 306a (associated with L2), and a second modulation section (spanning L3), and the second waveguide 304b may include a first modulation section (spanning L1), a time delay section 306b (associated with L2), and a second modulation section (spanning L3), as described above in connection with FIG. 1. In some implementations, portions of the time delay section 306a and the time delay section 306b may be located outside of the first waveguide 304a and the second waveguide 304b, as described above in connection with FIG. 1.

As shown in FIG. 3, a first modulation section and a second modulation section of a waveguide 304 may be configured to have opposite modulation polarities. For example, in the first section L1, the first electrode 302a (+ signal) may modulate an optical signal of the first waveguide 304a, and the second electrode 302b (− signal) may modulate an optical signal of the second waveguide 304b. Continuing with the previous example, in the third section L3, the first electrode 302a (+ signal) may modulate an optical signal of the second waveguide 304b, and the second electrode 302b (− signal) may modulate an optical signal of the first waveguide 304a, thereby reversing modulation polarity experienced by the second waveguide 304b relative to the first waveguide 304a. In particular, in the second section L2, the time delay section 306a and the time delay section 306b may cross, to thereby redirect the first waveguide 304a to the second electrode 302b and the second waveguide 304b to the first electrode 302a. In this way, a relative position of the loading lines 308 in the first section L1 and the third section L3 may be consistent.

In some implementations, the time delay section 306a and the time delay section 306b may cross substantially orthogonally. For example, the time delay section 306a and the time delay section 306b may cross at an angle of about 90 degrees (e.g., within ±10%, ±5%, or ±1%). In some implementations, the time delay section 306a and the time delay section 306b may cross at an angle greater than 75 degrees. In this way, optical loss and/or crosstalk due to the crossing may be reduced.

As indicated above, FIG. 3 is provided merely as an example. Other examples may differ from what is described with regard to FIG. 3.

Figure 4:
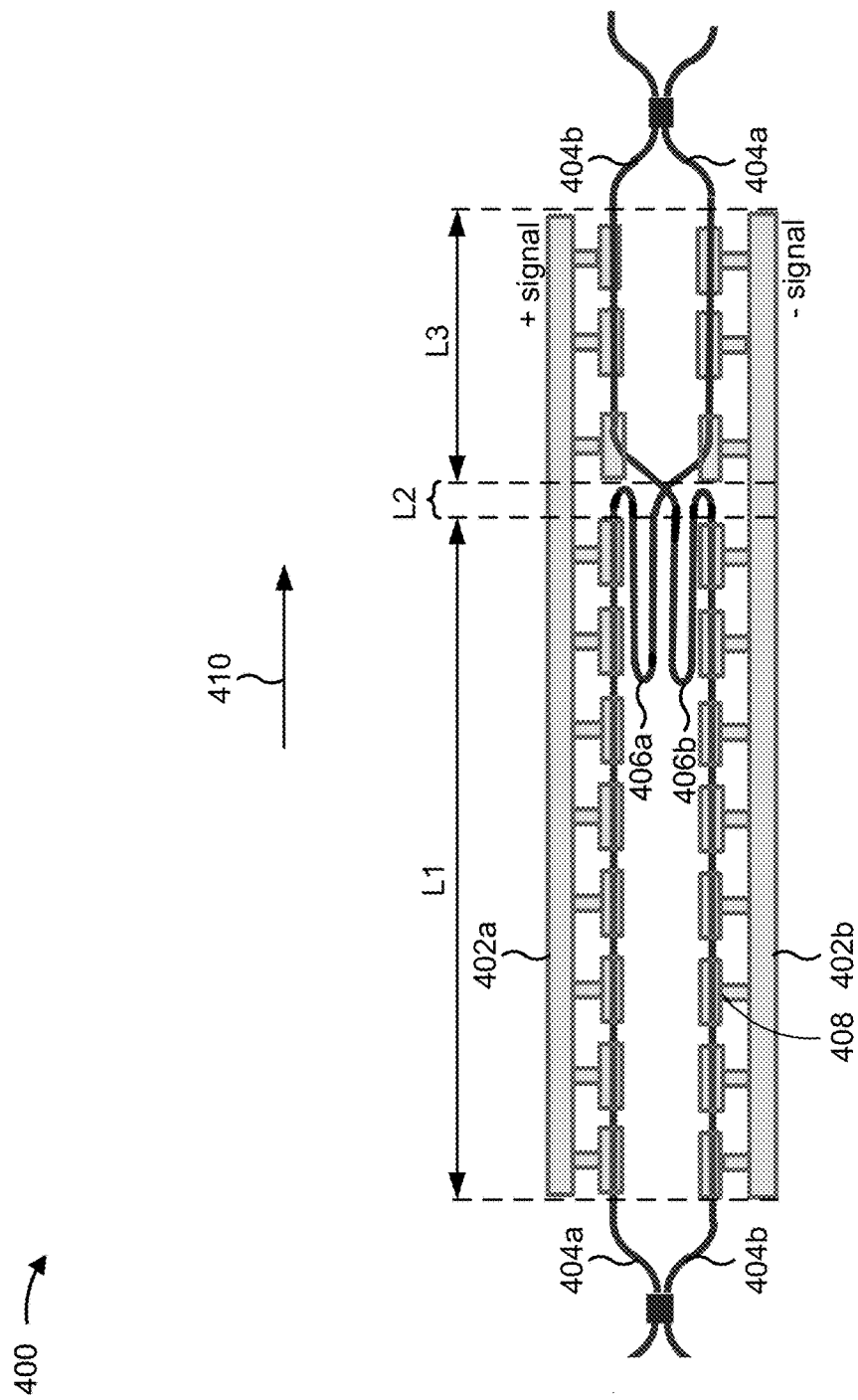

FIG. 4 is a diagram of an example electrical-optical modulator 400 described herein. As shown in FIG. 4, electrical-optical modulator 400 may include a first signal electrode 402a, a second signal electrode 402b, a first optical waveguide 404a, and a second optical waveguide 404b. Electrical signals of the electrodes 402 may interact with optical signals of the waveguides 404 via a plurality of segmented loading lines 408, as described above in connection with FIG. 1. The electrodes 402 may be configured to propagate an electrical signal in a direction of propagation 410 of the electrical-optical modulator 400, and the waveguides 404 may be configured to propagate an optical signal in the direction of propagation 410.

As shown in FIG. 4, the first waveguide 404a may include a first modulation section (spanning L1), a time delay section 406a (associated with L2), and a second modulation section (spanning L3), and the second waveguide 404b may include a first modulation section (spanning L1), a time delay section 406b (associated with L2), and a second modulation section (spanning L3), as described above in connection with FIG. 1. In some implementations, the time delay section 406a and the time delay section 406b may be located inside of the first waveguide 404a and the second waveguide 404b. That is, the time delay section 406a and the time delay section 406b may be located in a space between the first waveguide 404a and the second waveguide 404b. In this way, a footprint of the electrical-optical modulator 400 may be minimized.

As shown in FIG. 4, a first modulation section and a second modulation section of a waveguide 404 may be configured to have opposite modulation polarities, as described above in connection with FIG. 3. For example, in the second section L2, the time delay section 306a and the time delay section 306b may cross, as described above in connection with FIG. 3.

As indicated above, FIG. 4 is provided merely as an example. Other examples may differ from what is described with regard to FIG. 4.

Figure 5:
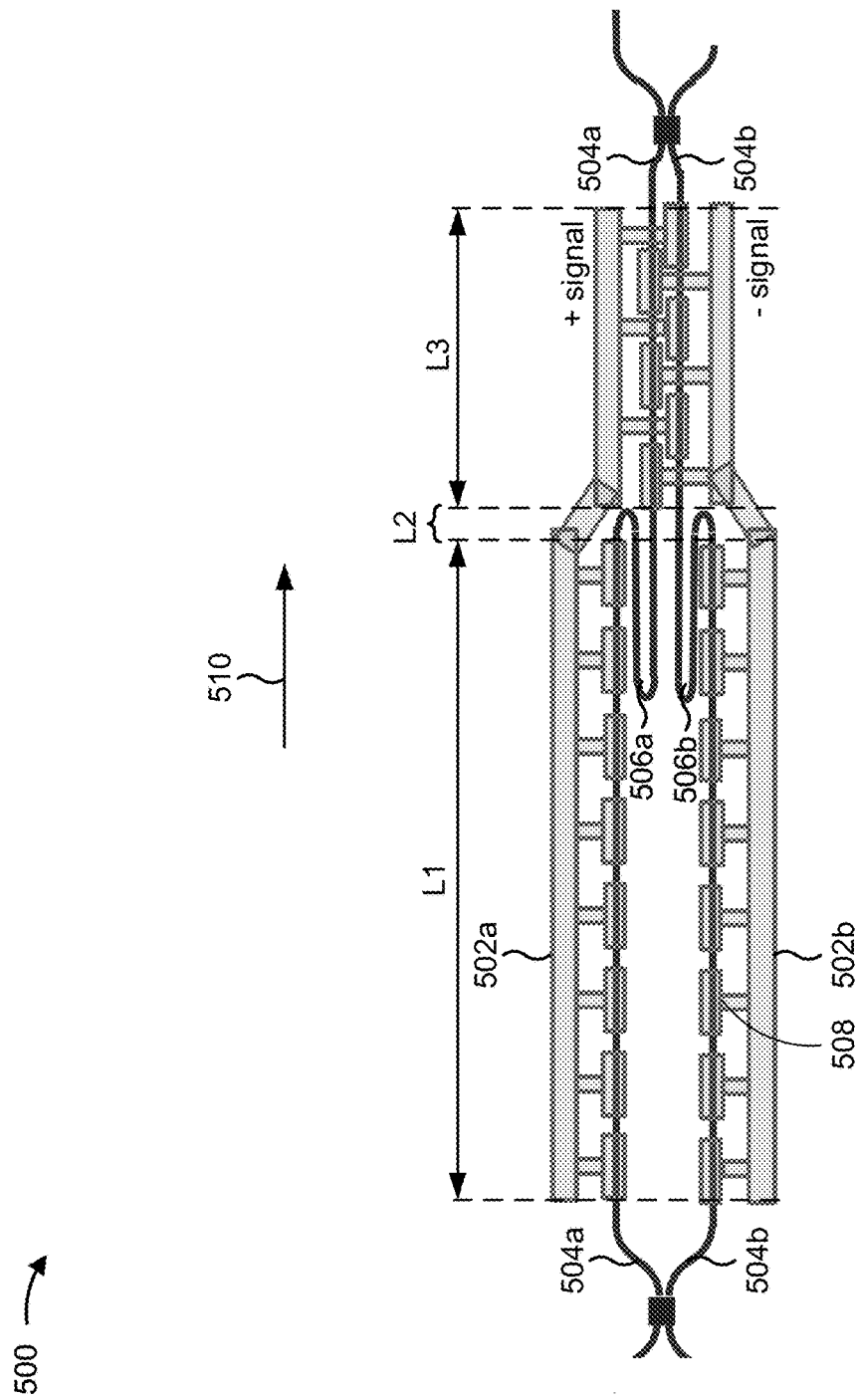

FIG. 5 is a diagram of an example electrical-optical modulator 500 described herein. As shown in FIG. 5, electrical-optical modulator 500 may include a first signal electrode 502a, a second signal electrode 502b, a first optical waveguide 504a, and a second optical waveguide 504b. Electrical signals of the electrodes 502 may interact with optical signals of the waveguides 504 via a plurality of segmented loading lines 508, as described above in connection with FIG. 1. The electrodes 502 may be configured to propagate an electrical signal in a direction of propagation 510 of the electrical-optical modulator 500, and the waveguides 504 may be configured to propagate an optical signal in the direction of propagation 510.

As shown in FIG. 5, the first waveguide 504a may include a first modulation section (spanning L1), a time delay section 506a (associated with L2), and a second modulation section (spanning L3), and the second waveguide 504b may include a first modulation section (spanning L1), a time delay section 506b (associated with L2), and a second modulation section (spanning L3), as described above in connection with FIG. 1. In some implementations, the time delay section 506a and the time delay section 506b may be located inside of the first waveguide 504a and the second waveguide 504b, as described above in connection with FIG. 4. In particular, the time delay section 506a and the time delay section 506b may be located between the first waveguide 504a and the second waveguide 504b in the first section L1. Accordingly, in the third section L3, a distance separating the first waveguide 504a and the second waveguide 504b may be less than a distance separating the first waveguide 504a and the second waveguide 504b in the first section L1 (e.g., the first waveguide 504a and the second waveguide 504b may be directed closer in the third section L3). In this way, a footprint of the electrical-optical modulator 500, and a length of connections between loading lines 508 and the electrodes 502 in the third section L3, may be minimized.

As shown in FIG. 5, a first modulation section and a second modulation section of a waveguide 504 may be configured to have opposite modulation polarities, as described above in connection with FIG. 1. For example, in the first section L1, loading lines 508 of the first electrode 502a may cover the first waveguide 504a, and loading lines 508 of the second electrode 502b may cover the second waveguide 504b. In the third section L3, loading lines 508 of the first electrode 502a may cover the second waveguide 504b, and loading lines 508 of the second electrode 502b may cover the first waveguide 504a, as described above in connection with FIG. 1.

As indicated above, FIG. 5 is provided merely as an example. Other examples may differ from what is described with regard to FIG. 5.

Figure 6:
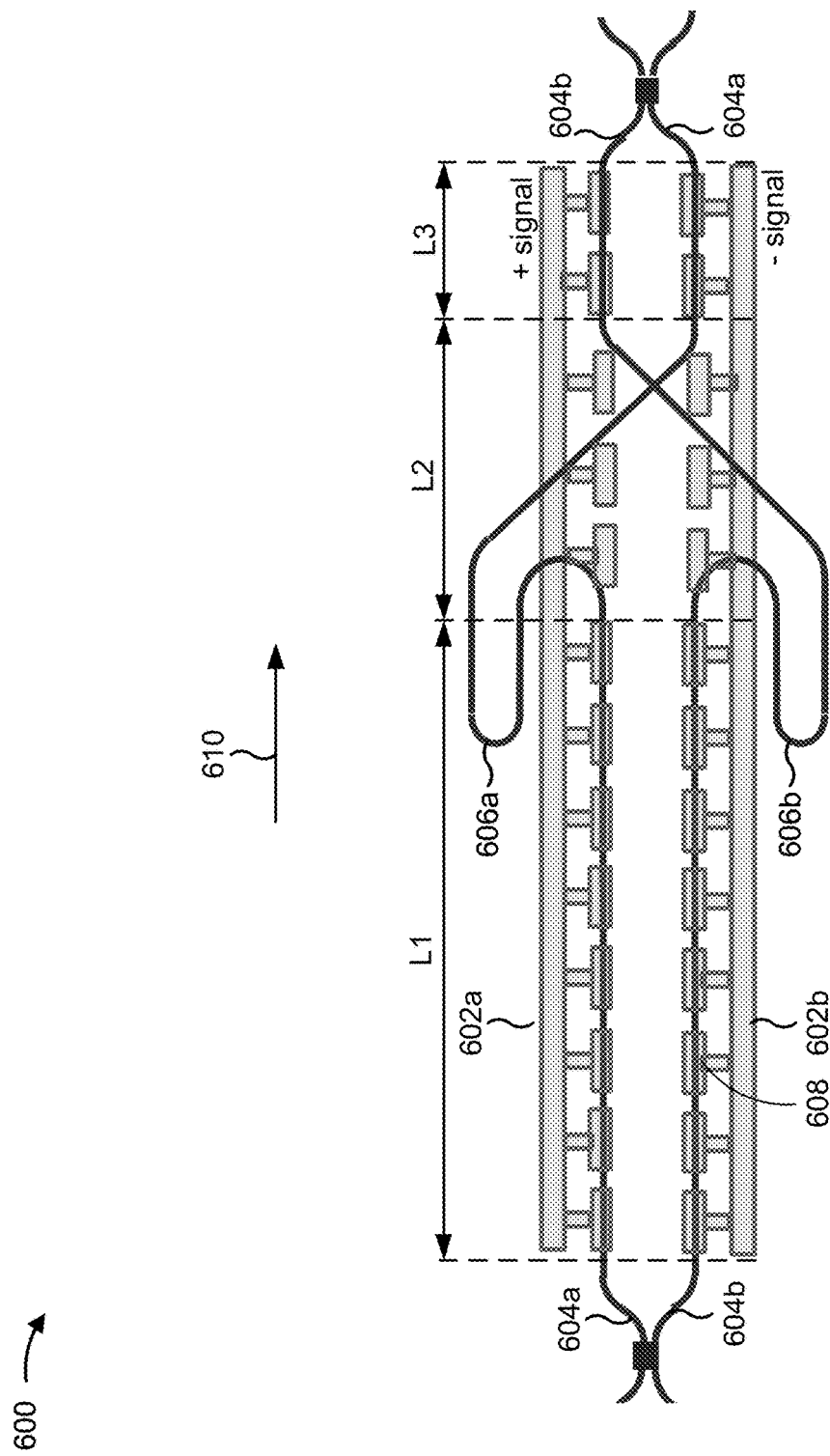

FIG. 6 is a diagram of an example electrical-optical modulator 600 described herein. As shown in FIG. 6, electrical-optical modulator 600 may include a first signal electrode 602a, a second signal electrode 602b, a first optical waveguide 604a, and a second optical waveguide 604b. Electrical signals of the electrodes 602 may interact with optical signals of the waveguides 604 via a plurality of segmented loading lines 608, as described above in connection with FIG. 1. The electrodes 602 may be configured to propagate an electrical signal in a direction of propagation 610 of the electrical-optical modulator 600, and the waveguides 604 may be configured to propagate an optical signal in the direction of propagation 610.

As shown in FIG. 6, the first waveguide 604a may include a first modulation section (spanning L1), a time delay section 606a (associated with L2), and a second modulation section (spanning L3), and the second waveguide 604b may include a first modulation section (spanning L1), a time delay section 606b (associated with L2), and a second modulation section (spanning L3), as described above in connection with FIG. 1. In some implementations, portions of the time delay section 606a and the time delay section 606b may be located outside of the first waveguide 604a and the second waveguide 604b, as described above in connection with FIG. 1.

As shown in FIG. 6, a first modulation section and a second modulation section of a waveguide 604 may be configured to have opposite modulation polarities, as described above in connection with FIG. 3. For example, in the second section L2, the time delay section 606a and the time delay section 606b may cross, as described above in connection with FIG. 3. In some implementations, the time delay section 606a and the time delay section 606b may respectively terminate in a straight section, such that the time delay section 606a and the time delay section 606b cross substantially orthogonally.

As indicated above, FIG. 6 is provided merely as an example. Other examples may differ from what is described with regard to FIG. 6.

Figure 7:
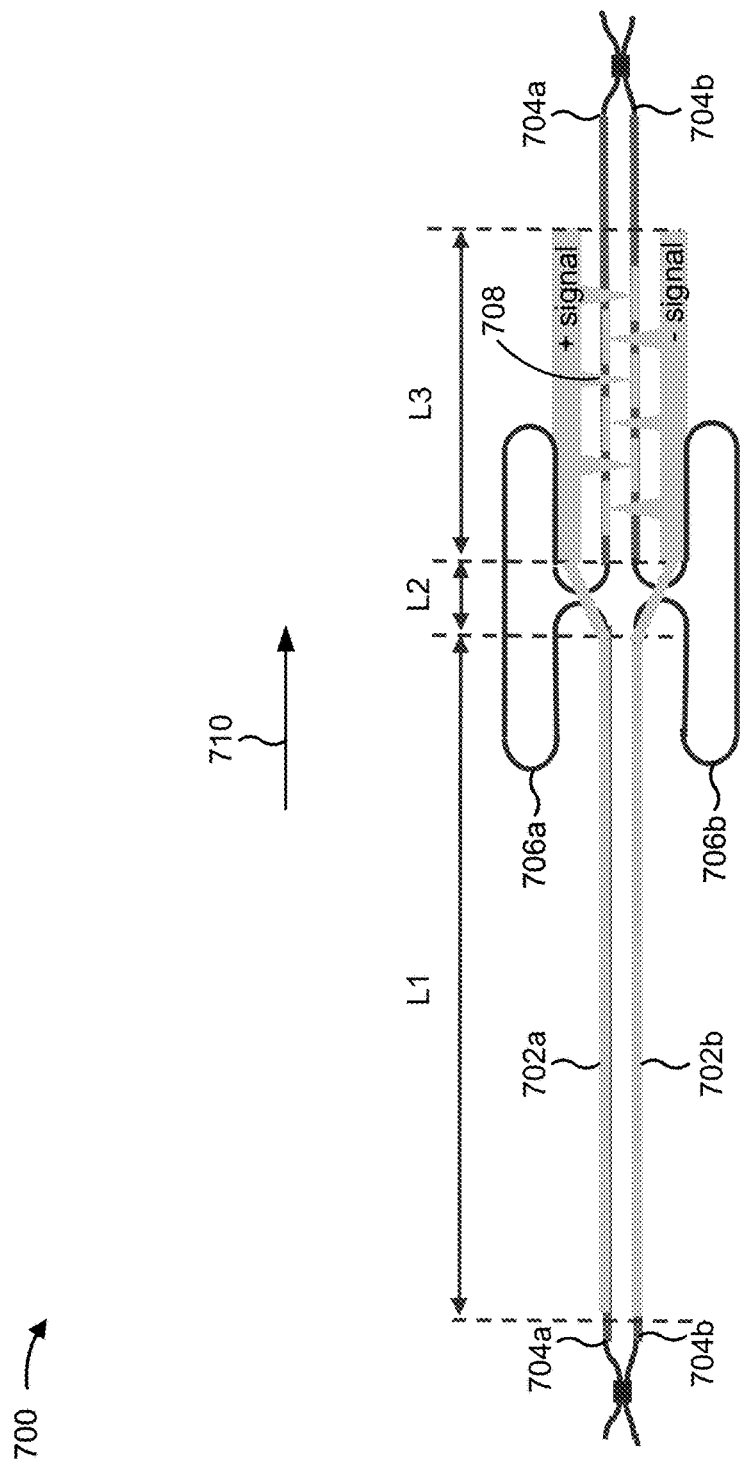

FIG. 7 is a diagram of an example electrical-optical modulator 700 described herein. As shown in FIG. 7, electrical-optical modulator 700 may include a first signal electrode 702a, a second signal electrode 702b, a first optical waveguide 704a, and a second optical waveguide 704b. In the first section L1, electrical signals of the electrodes 702 may interact with optical signals of the waveguides 704 without use of loading lines 708 (e.g., signal velocities of the electrodes 702 and waveguides 704 may be different). In the third section L3, electrical signals of the electrodes 702 may interact with optical signals of the waveguides 704 via a plurality of segmented loading lines 708, as described above in connection with FIG. 1. The electrodes 702 may be configured to propagate an electrical signal in a direction of propagation 710 of the electrical-optical modulator 700, and the waveguides 704 may be configured to propagate an optical signal in the direction of propagation 710.

As shown in FIG. 7, the first waveguide 704a may include a first modulation section (spanning L1), a time delay section 706a (associated with L2), and a second modulation section (spanning L3), and the second waveguide 704b may include a first modulation section (spanning L1), a time delay section 706b (associated with L2), and a second modulation section (spanning L3), as described above in connection with FIG. 1. In some implementations, L1 may be 1200 μm, L2 may be 250 μm, and L3 may be 300 μm.

In some implementations, in the first section L1, the first electrode 702a and the first waveguide 704a may be co-linear and the second electrode 702b and the second waveguide 704b may be co-linear. For example, in the first section L1, the electrodes 702 may be microstrip electrodes. In such a case, the first section L1 may use a reduced drive voltage relative to the third section L3, thereby improving modulation efficiency. In some implementations, portions of the time delay section 706a and the time delay section 706b may be located outside of the first waveguide 704a and the second waveguide 704b, as described above in connection with FIG. 1.

As shown in FIG. 7, a first modulation section and a second modulation section of a waveguide 704 may be configured to have opposite modulation polarities, as described above in connection with FIG. 1. For example, in the first section L1, the first electrode 702a may cover the first waveguide 704a, and the second electrode 702b may cover the second waveguide 704b. In the third section L3, loading lines 708 of the first electrode 702a may cover the second waveguide 704b, and loading lines 708 of the second electrode 702b may cover the first waveguide 704a, as described above in connection with FIG. 1.

In some implementations, in the third section L3, the electrodes 702 (e.g., microstrip electrodes) may be co-linear with respective waveguides 704 (e.g., without loading lines 708), as described for the first section L1. In such a case, in the second section L2, the time delay section 706a and the time delay section 706b may cross, as described above in connection with FIG. 3, to thereby reverse modulation polarity experienced by the second waveguide 704b relative to the first waveguide 704a.

As indicated above, FIG. 7 is provided merely as an example. Other examples may differ from what is described with regard to FIG. 7.

Figure 8:
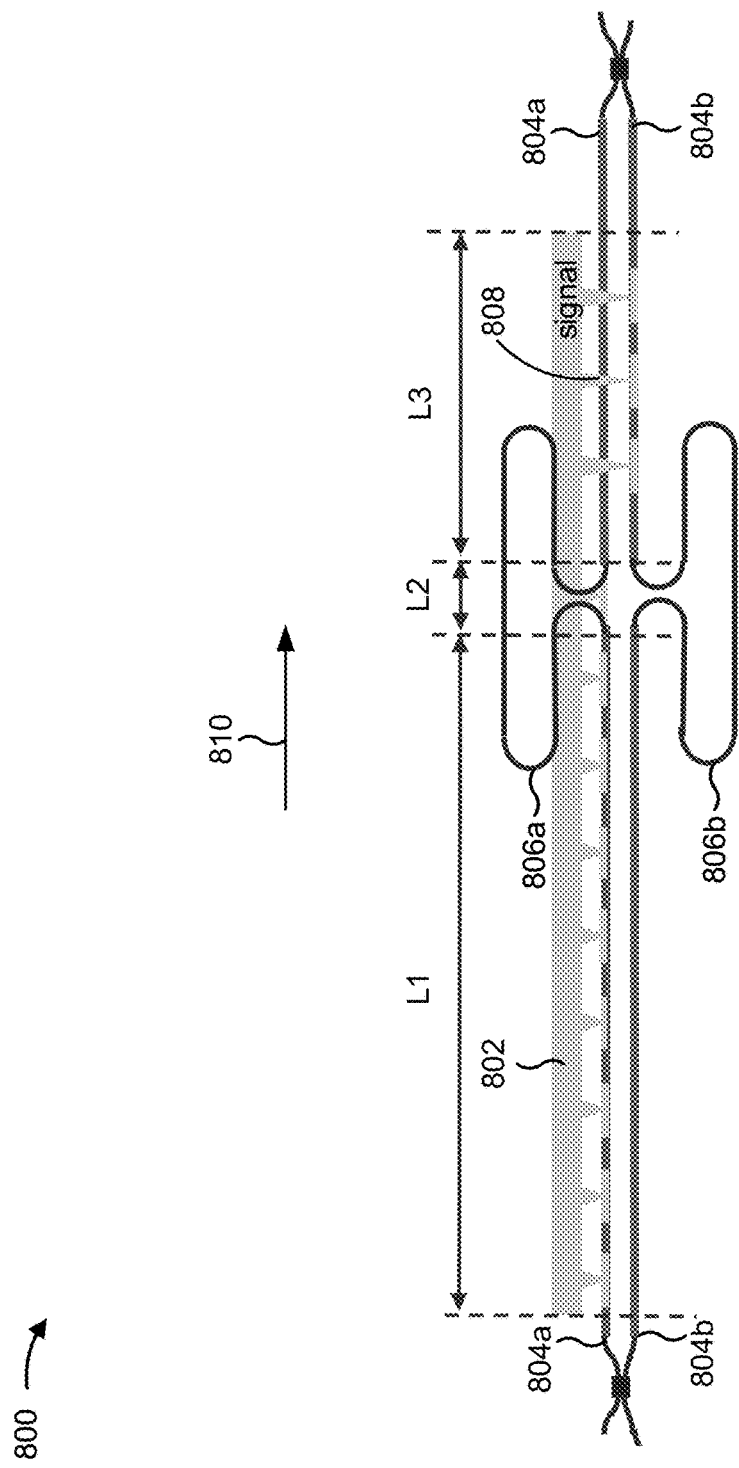

FIG. 8 is a diagram of an example electrical-optical modulator 800 described herein. As shown in FIG. 8, electrical-optical modulator 800 may include a signal electrode 802, a first optical waveguide 804a, and a second optical waveguide 804b. Electrical signals of the electrode 802 may interact with optical signals of the waveguides 804 via a plurality of segmented loading lines 808, as described above in connection with FIG. 1. The electrode 802 may be configured to propagate an electrical signal in a direction of propagation 810 of the electrical-optical modulator 800, and the waveguides 804 may be configured to propagate an optical signal in the direction of propagation 810.

As shown in FIG. 8, the first waveguide 804a may include a first modulation section (spanning L1), a time delay section 806a (associated with L2), and a second modulation section (spanning L3), and the second waveguide 804b may include a first modulation section (spanning L1), a time delay section 806b (associated with L2), and a second modulation section (spanning L3), as described above in connection with FIG. 1. In some implementations, portions of the time delay section 806a and the time delay section 806b may be located outside of the first waveguide 804a and the second waveguide 804b, as described above in connection with FIG. 1.

As shown in FIG. 8, a first modulation section and a second modulation section of a waveguide 804 may be configured to change modulation polarity. For example, in the first section L1, loading lines 808 of the electrode 802 may cover the first waveguide 804a (e.g., such that the first waveguide 804a interacts with the electrode 802 and the second waveguide 804b does not interact with the electrode 802). In the third section L3, loading lines 808 of the electrode 802 may cover the second waveguide 804b (e.g., such that the first waveguide 804a does not interact with the electrode 802 and the second waveguide 804b interacts with the electrode 802).

As indicated above, FIG. 8 is provided merely as an example. Other examples may differ from what is described with regard to FIG. 8.

Figure 9:
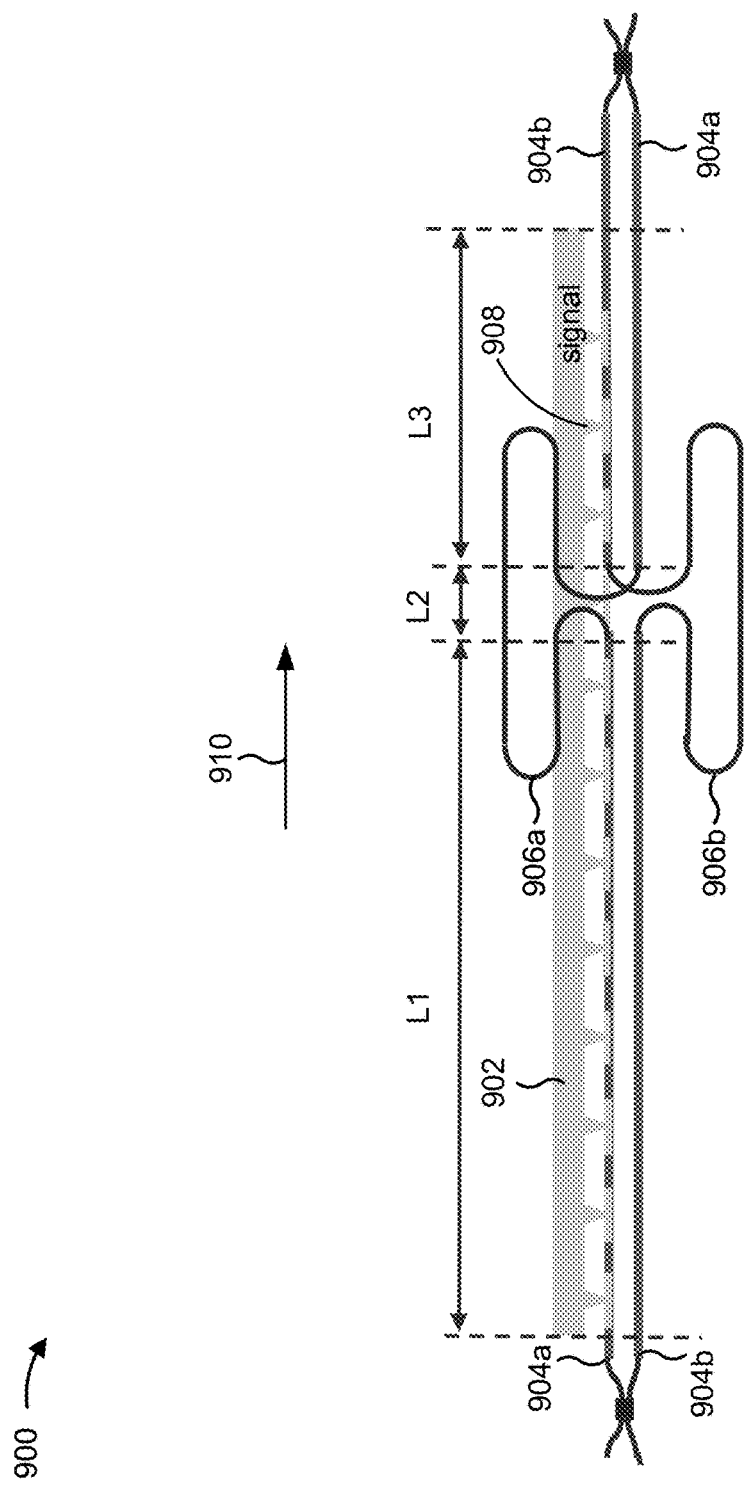

FIG. 9 is a diagram of an example electrical-optical modulator 900 described herein. As shown in FIG. 9, electrical-optical modulator 900 may include a signal electrode 902, a first optical waveguide 904a, and a second optical waveguide 904b. Electrical signals of the electrode 902 may interact with optical signals of the waveguides 904 via a plurality of segmented loading lines 908, as described above in connection with FIG. 1. The electrode 902 may be configured to propagate an electrical signal in a direction of propagation 910 of the electrical-optical modulator 900, and the waveguides 904 may be configured to propagate an optical signal in the direction of propagation 910.

As shown in FIG. 9, the first waveguide 904a may include a first modulation section (spanning L1), a time delay section 906a (associated with L2), and a second modulation section (spanning L3), and the second waveguide 904b may include a first modulation section (spanning L1), a time delay section 906b (associated with L2), and a second modulation section (spanning L3), as described above in connection with FIG. 1. In some implementations, portions of the time delay section 906a and the time delay section 906b may be located outside of the first waveguide 904a and the second waveguide 904b, as described above in connection with FIG. 1.

As shown in FIG. 9, a first modulation section and a second modulation section of a waveguide 904 may be configured to change modulation polarity. For example, in the second section L2, the time delay section 906a and the time delay section 906b may cross, as described above in connection with FIG. 3. Accordingly, in the first section L1, loading lines 908 of the electrode 902 may cover the first waveguide 904a (e.g., such that the first waveguide 904a interacts with the electrode 902 and the second waveguide 904b does not interact with the electrode 902). In the third section L3, loading lines 908 of the electrode 902 may cover the second waveguide 904b (e.g., such that the first waveguide 904a does not interact with the electrode 902 and the second waveguide 904b interacts with the electrode 902).

As indicated above, FIG. 9 is provided merely as an example. Other examples may differ from what is described with regard to FIG. 9.

Figure 10:
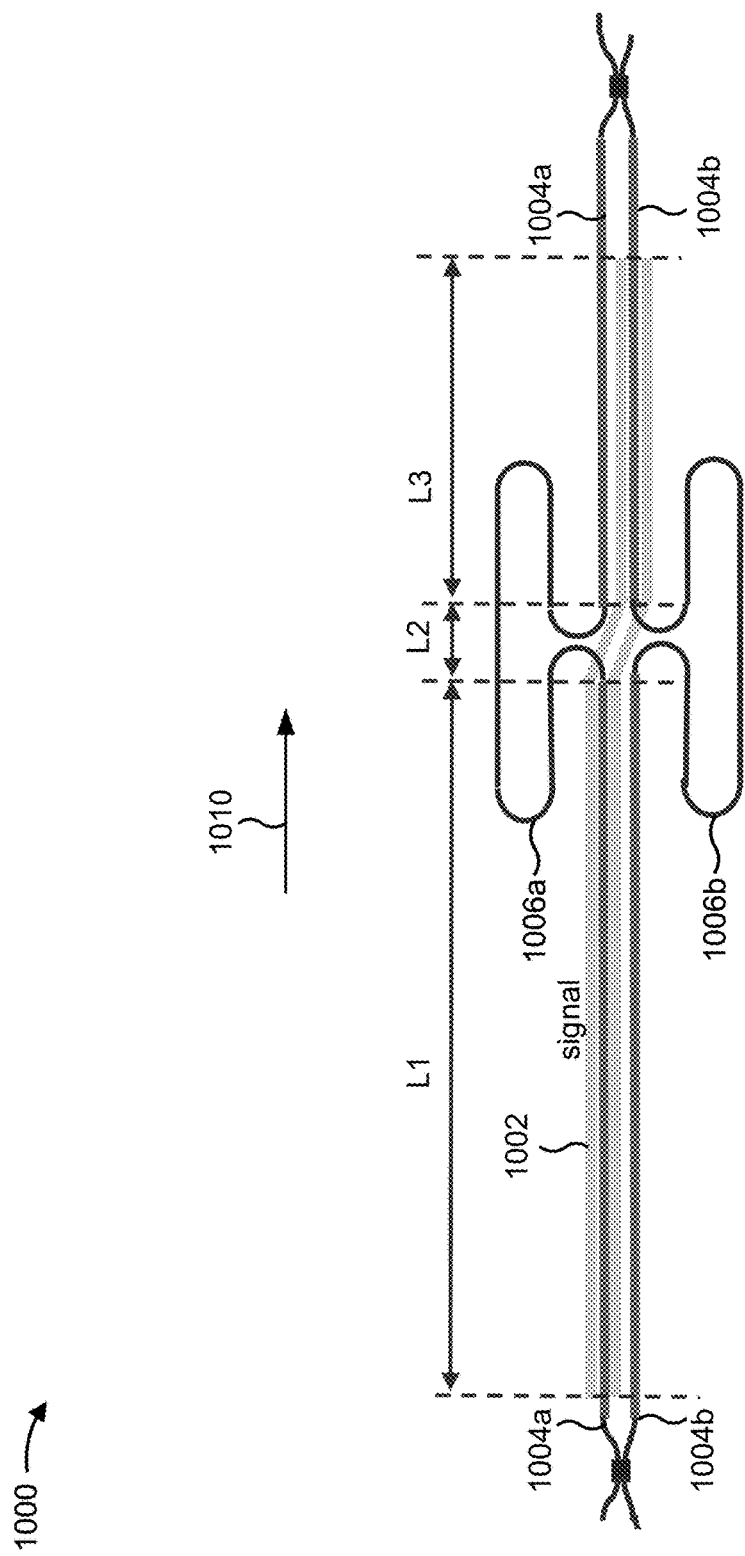

FIG. 10 is a diagram of an example electrical-optical modulator 1000 described herein. As shown in FIG. 10, electrical-optical modulator 1000 may include a signal electrode 1002, a first optical waveguide 1004a, and a second optical waveguide 1004b. The electrode 1002 may be a coplanar strip electrode that may interact with optical signals of the waveguides 1004. For example, the coplanar strip electrode may interact with optical signals of a waveguide 1004 disposed between the coplanar strips of the electrode 1002. The electrode 1002 may be configured to propagate an electrical signal in a direction of propagation 1010 of the electrical-optical modulator 1000, and the waveguides 1004 may be configured to propagate an optical signal in the direction of propagation 1010.

As shown in FIG. 10, the first waveguide 1004a may include a first modulation section (spanning L1), a time delay section 1006a (associated with L2), and a second modulation section (spanning L3), and the second waveguide 1004b may include a first modulation section (spanning L1), a time delay section 1006b (associated with L2), and a second modulation section (spanning L3), as described above in connection with FIG. 1. In some implementations, portions of the time delay section 1006a and the time delay section 1006b may be located outside of the first waveguide 1004a and the second waveguide 1004b, as described above in connection with FIG. 1.

As shown in FIG. 10, a first modulation section and a second modulation section of a waveguide 1004 may be configured to change modulation polarity. For example, in the first section L1, the coplanar strips of the electrode 1002 may surround the first waveguide 1004a (e.g., such that the first waveguide 1004a interacts with the electrode 1002 and the second waveguide 1004b does not interact with the electrode 1002). In the third section L3, the coplanar strips of the electrode 1002 may surround the second waveguide 1004b (e.g., such that the first waveguide 1004a does not interact with the electrode 1002 and the second waveguide 1004b interacts with the electrode 1002). For example, in the second section L2, a path of the electrode 1002 may transition from the first waveguide 1004a to the second waveguide 1004b.

As indicated above, FIG. 10 is provided merely as an example. Other examples may differ from what is described with regard to FIG. 10.

Figure 11:
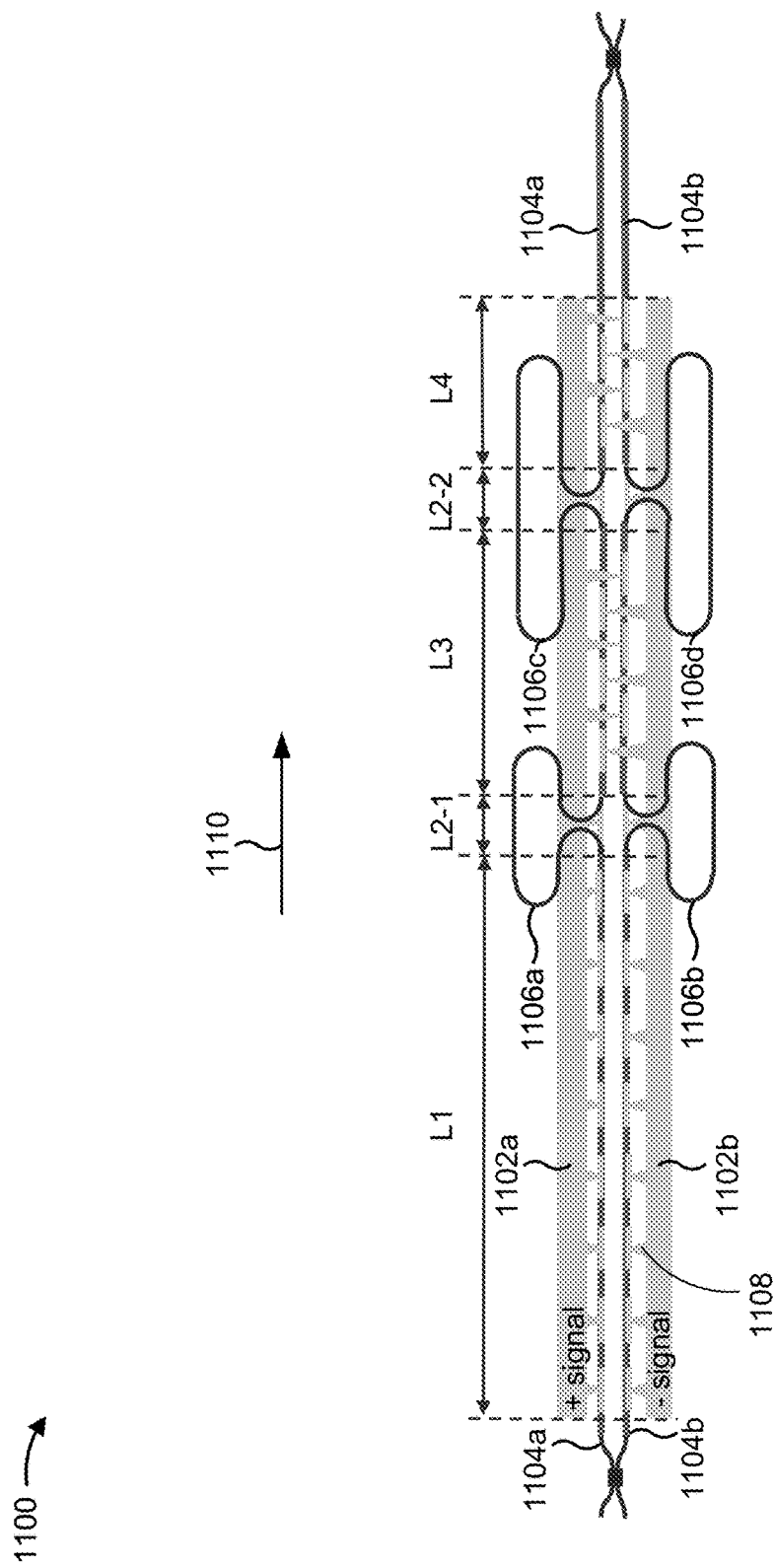

FIG. 11 is a diagram of an example electrical-optical modulator 1100 described herein. As shown in FIG. 11, electrical-optical modulator 1100 may include a first signal electrode 1102a, a second signal electrode 1102b, a first optical waveguide 1104a, and a second optical waveguide 1104b. Electrical signals of the electrodes 1102 may interact with optical signals of the waveguides 1104 via a plurality of segmented loading lines 1108, as described above in connection with FIG. 1. The electrodes 1102 may be configured to propagate an electrical signal in a direction of propagation 1110 of the electrical-optical modulator 1100, and the waveguides 1104 may be configured to propagate an optical signal in the direction of propagation 1110.

As shown in FIG. 11, the first waveguide 1104a may include a first modulation section (spanning L1), a first time delay section 1106a (associated with length L2-1), and a second modulation section (spanning L3), and the second waveguide 1104b may include a first modulation section (spanning L1), a first time delay section 1106b (associated with length L2-1), and a second modulation section (spanning L3), as described above in connection with FIG. 1. In addition, the first waveguide 1104a may include a second time delay section 1106c (associated with length L2-2), and a third modulation section (spanning length L4), and the second waveguide 1104b may include a second time delay section 1106d (associated with length L2-2), and a third modulation section (spanning length L4). The second time delay sections 1106c, 1106d may function similarly to the first time delay sections 1106a, 1106b, and the third modulation sections may function similarly to the second modulation sections. In some implementations, electrical-optical modulator 1100 may include additional time delay sections and/or modulation sections.

In some implementations, portions of the first time delay sections 1106a, 1106c and the second time delay sections 1106b, 1106d may be located outside of the first waveguide 1104a and the second waveguide 1104b, as described above in connection with FIG. 1. In some implementations, respective path lengths, and corresponding time delays, of the first time delay sections 1106a, 1106c and the second time delay sections 1106b, 1106d may be different.

As shown in FIG. 11, a first modulation section and a second modulation section, or a third modulation section, of a waveguide 1104 may be configured to have opposite modulation polarities, as described above in connection with FIG. 1. For example, in the first section L1, loading lines 1108 of the first electrode 1102a may cover the first waveguide 1104a, and loading lines 1108 of the second electrode 1102b may cover the second waveguide 1104b. In the third section L3, loading lines 1108 of the first electrode 1102a may cover the second waveguide 1104b, and loading lines 1108 of the second electrode 1102b may cover the first waveguide 1104a, as described above in connection with FIG. 1. In the fourth section L4, loading lines 1108 of the first electrode 1102a may cover the second waveguide 1104b, and loading lines 1108 of the second electrode 1102b may cover the first waveguide 1104a. In some implementations, in the third section L3 or the fourth section L4, the loading lines 1108 may not reverse a modulation polarity of the waveguides 1104 relative to the first section L1.

As indicated above, FIG. 11 is provided merely as an example. Other examples may differ from what is described with regard to FIG. 11.

In this way, lengths and/or modulation polarities of the modulation sections and/or the time delay sections may be tailored (e.g., using a model of frequency response) to target a particular frequency response. Furthermore, using multiple modulation sections and/or time delay sections enables tailoring of a shape an electrical-optical frequency response to further target a particular frequency response bandwidth and/or shape. For example, the frequency response shape may be tailored to be complementary to a shape of a particular electrical driver.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An electrical-optical modulator, comprising:
   one or more optical waveguides to propagate one or more optical signals in a direction of propagation,
   an optical waveguide of the one or more optical waveguides including a time delay section, a first modulation section preceding the time delay section in the direction of propagation, and a second modulation section following the time delay section in the direction of propagation,
   the first modulation section and the second modulation section configured to be associated with opposite modulation polarities, and the time delay section configured to delay a phase of the one or more optical signals relative to the first modulation section, and
   the first modulation section, the time delay section, and the second modulation section are collectively configured to tailor a shape of an electrical-optical frequency response to target a particular frequency response bandwidth or shape; and one or more signal electrodes to propagate one or more signals in the direction of propagation in order to modulate the one or more optical signals through an electrical-optical interaction, wherein the one or more signal electrodes include a first signal electrode and a second signal electrode, and the one or more optical waveguides include a first optical waveguide and a second optical waveguide, wherein the electrical-optical interaction is via first loading lines of the first signal electrode and second loading lines of the second signal electrode, wherein the first signal electrode is to modulate, via the first loading lines, the one or more optical signals at the first modulation section of the first optical waveguide and at the second modulation section of the second optical waveguide, and the second signal electrode is to modulate, via the second loading lines, the one or more optical signals at the first modulation section of the second optical waveguide and at the second modulation section of the first optical waveguide, and wherein, in the second modulation section, the first loading lines cross the first optical waveguide to interact with the second optical waveguide, and the second loading lines cross the second optical waveguide to interact with the first optical waveguide.

2. The electrical-optical modulator of claim 1, wherein respective time delay sections of the first optical waveguide and the second optical waveguide cross at an angle of about 90 degrees.

3. The electrical-optical modulator of claim 1, wherein portions of respective time delay sections of the first optical waveguide and the second optical waveguide are located outside of the first optical waveguide and the second optical waveguide.

4. The electrical-optical modulator of claim 1, wherein respective time delay sections of the first optical waveguide and the second optical waveguide are located in a space between the first optical waveguide and the second optical waveguide.

5. The electrical-optical modulator of claim 1, wherein the time delay section is not in a straight line, and the first modulation section and the second modulation section are in a straight line.

6. The electrical-optical modulator of claim 1, wherein the time delay section is configured to guide the one or more optical signals in at least one direction other than the direction of propagation.

7. The electrical-optical modulator of claim 1, wherein the time delay section is configured to provide a path-length delay.

8. The electrical-optical modulator of claim 1, wherein the time delay section is in optical communication with the first modulation section at a first junction and the second modulation section at a second junction, and a path length of a signal electrode of the one or more signal electrodes between the first junction and the second junction is less than a path length of the time delay section.

9. The electrical-optical modulator of claim 1, wherein a signal electrode of the one or more signal electrodes includes a microstrip electrode in association with the first modulation section of the optical waveguide, and the signal electrode includes an electrode having one or more segmented loading lines in association with the second modulation section of the optical waveguide.

10. The electrical-optical modulator of claim 1, wherein respective time delay sections of the first optical waveguide and the second optical waveguide cross.

11. The electrical-optical modulator of claim 1, wherein the optical waveguide includes multiple time delay sections.

12. The electrical-optical modulator of claim 1, wherein the electrical-optical modulator is included in a set of electrical-optical modulators supported on a substrate.

13. The electrical-optical modulator of claim 1, wherein an odd number of polarity reversals are included in a single section of the first modulation section, the time delay section, or the second modulation section.

14. The electrical-optical modulator of claim 1, wherein an odd number of polarity reversals, included in the first modulation section, the time delay section, and the second modulation section, cancel a phase shift caused by the time delay section.

15. The electrical-optical modulator of claim 1, wherein the first modulation section, the time delay section, and the second modulation section collectively include an even number of phase reversals.

16. The electrical-optical modulator of claim 1, wherein, in the second modulation section, the first loading lines cross the first optical waveguide to interact with the second optical waveguide, and the second loading lines cross the second optical waveguide to interact with the first optical waveguide.

17. The electrical-optical modulator of claim 1, wherein the first signal electrode remains parallel to the second signal electrode through the time delay section.

18. The electrical-optical modulator of claim 1, wherein a distance between the first signal electrode and the second signal electrode remains constant for each of the time delay section, the first modulation section, and the second modulation section.

19. An electrical-optical modulator, comprising:
one or more pairs of phase delay sections and modulation polarity reversal sections,
the electrical-optical modulator having a frequency response characterized by a modulation bandwidth above a threshold value,
at least two of the modulation polarity reversal sections being configured to be associated with opposite modulation polarities,
the phase delay sections being configured to delay a phase of one or more optical signals,
the electrical-optical modulator being configured to tailor a shape of an electrical-optical frequency response to target a particular frequency response bandwidth or shape, and
one or more signal electrodes of the electrical-optical modulator being configured to modulate the one or more optical signals through an electrical-optical interaction,
wherein the one or more signal electrodes include a first signal electrode and a second signal electrode for electrical-optical interaction with a first optical waveguide and a second optical waveguide,
wherein the electrical-optical interaction is via first loading lines of the first signal electrode and second loading lines of the second signal electrode,
wherein the first signal electrode is to modulate, via the first loading lines and for the first optical waveguide, the one or more optical signals at a first of the at least two of the modulation polarity reversal sections, and modulate, via the first loading lines and for the second optical waveguide, the one or more optical signals at a second of the at least two of the modulation polarity reversal sections, wherein the second signal electrode is to modulate, via the second loading lines and for the second optical waveguide, the one or more optical signals at the first of the at least two of the modulation polarity reversal sections, and modulate, via the second loading lines and for the first optical waveguide, the one or more optical signals at the second of the at least two of the modulation polarity reversal sections, and wherein, in the second of the at least two of the modulation polarity reversal sections, the first loading lines cross the first optical waveguide to interact with the second optical waveguide, and the second loading lines cross the second optical waveguide to interact with the first optical waveguide.

20. The electrical-optical modulator of claim 19, wherein an odd number of polarity reversals, collectively included in the one or more pairs of the phase delay sections and the modulation polarity reversal sections, cancel a phase shift caused by a phase delay section of the phase delay sections.

21. The electrical-optical modulator of claim 19, wherein the first signal electrode remains parallel to the second signal electrode through the phase delay sections.

22. The electrical-optical modulator of claim 19, wherein a distance between the first signal electrode and the second signal electrode remains constant for each of the phase delay sections and the modulation polarity reversal sections.

23. An electrical-optical modulator, comprising:
one or more optical waveguides to propagate one or more optical signals in a circuitous path; and
one or more signal electrodes to propagate one or more signals in a direct path in order to modulate the one or more optical signals through electrical-optical interaction, wherein a proximity of the one or more optical waveguides and the one or more signal electrodes create an optical time delay defining a particular frequency and suppressing a frequency response below the particular frequency without suppressing the frequency response above the particular frequency, wherein the one or more signal electrodes include a first signal electrode and a second signal electrode, and the one or more optical waveguides include a first optical waveguide and a second optical waveguide, wherein the electrical-optical interaction is via first loading lines of the first signal electrode and second loading lines of the second signal electrode, wherein the one or more signal electrodes are configured to apply opposite modulation polarities to the one or more signals, wherein the first signal electrode is to modulate, via the first loading lines, the one or more optical signals at a first modulation section of the first optical waveguide and at a second modulation section of the second optical waveguide, and the second signal electrode is to modulate, via the second loading lines, the one or more optical signals at the first modulation section of the second optical waveguide and at the second modulation section of the first optical waveguide, wherein, in the second modulation section, the first loading lines cross the first optical waveguide to interact with the second optical waveguide, and the second loading lines cross the second optical waveguide to interact with the first optical waveguide, and wherein the electrical-optical modulator is configured to tailor a shape of an electrical-optical frequency response to target a particular frequency response bandwidth or shape.

* * * * *